US012761011B2

(12) United States Patent
Perri

(10) Patent No.: US 12,761,011 B2
(45) Date of Patent: Oct. 13, 2026

(54) INTERFEROMETER APPARATUS

(71) Applicant: NIREOS S.r.l, Milan (IT)

(72) Inventor: Antonio Perri, Biassono (IT)

(73) Assignee: NIREOS S.r.l (IT)

( * ) Notice: Subject to any disclaimer, the term of this patent is extended or adjusted under 35 U.S.C. 154(b) by 157 days.

(21) Appl. No.: 18/611,158

(22) Filed: Mar. 20, 2024

(65) Prior Publication Data

US 2024/0318952 A1 Sep. 26, 2024

(30) Foreign Application Priority Data

Mar. 21, 2023 (IT) ........................ 102023000005346

(51) Int. Cl.
*G01B 9/02* (2022.01)
*G01B 9/02001* (2022.01)

(52) U.S. Cl.
CPC ............ *G01B 9/02011* (2013.01); *G01B 9/02* (2013.01)

(58) Field of Classification Search
CPC .. G01B 9/02011; G01B 9/02; G01B 9/02061; G01B 9/02058; G01B 9/02097; G01J 3/45; G01N 21/6445; G01N 21/6456; G01N 2021/6421
See application file for complete search history.

(56) References Cited

U.S. PATENT DOCUMENTS

| | | | | |
|---|---|---|---|---|
| 3,737,235 A * | 6/1973 | Hawes | G01J 3/4537 356/453 |
| 5,781,293 A * | 7/1998 | Padgett | G01J 3/447 356/453 |
| 2013/0329228 A1* | 12/2013 | Manzoni | G01J 3/453 359/489.05 |
| 2014/0185052 A1* | 7/2014 | Chen | G01J 3/0224 356/453 |
| 2021/0123808 A1* | 4/2021 | Polli | G01J 3/2823 |
| 2021/0181022 A1* | 6/2021 | Manzoni | G01J 3/0208 |

* cited by examiner

*Primary Examiner* — Jonathan M Hansen
(74) *Attorney, Agent, or Firm* — Mark Malek; Widerman Malek, PL

(57) ABSTRACT

An interferometer apparatus comprises an adjustable birefringent device configured to receive an input radiation and produce corresponding replicas having reciprocally orthogonal polarizations and delayed from each other by an adjustable time delay. The birefringent device also introduces an additional time delay between the replicas. The interferometer apparatus also comprises a compensation optical device optically coupled to the adjustable birefringent device and configured to have a respective structural thickness and respective ordinary and extraordinary refractive indexes to introduce a compensation time delay between the replicas having a sign opposite to a sign of the additional time delay.

14 Claims, 10 Drawing Sheets

FIG.2
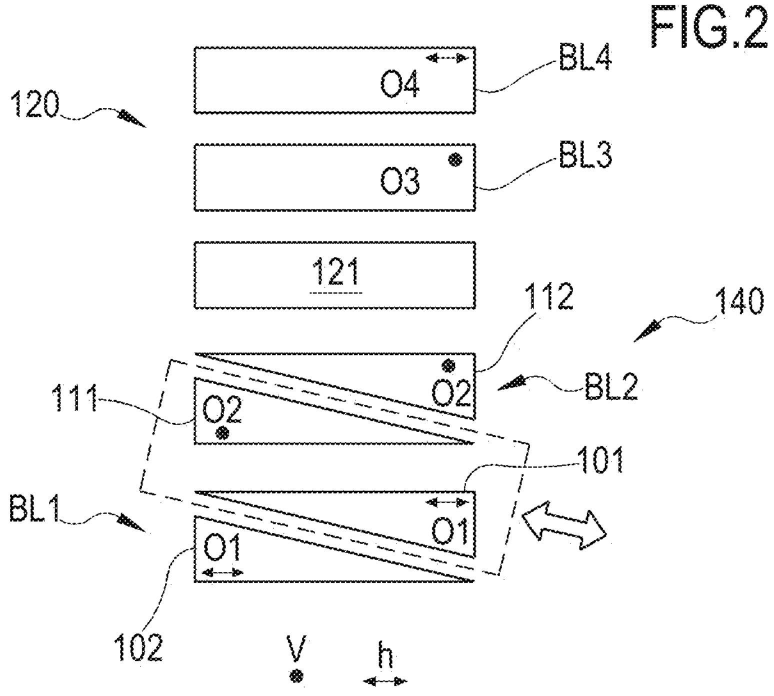
FIG.3
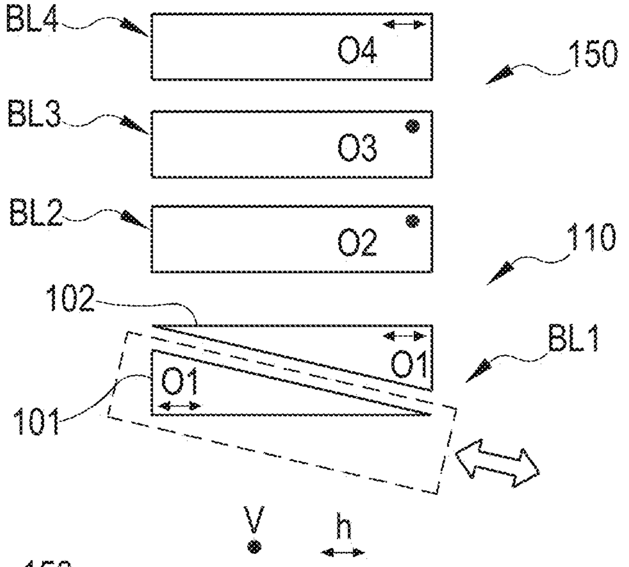
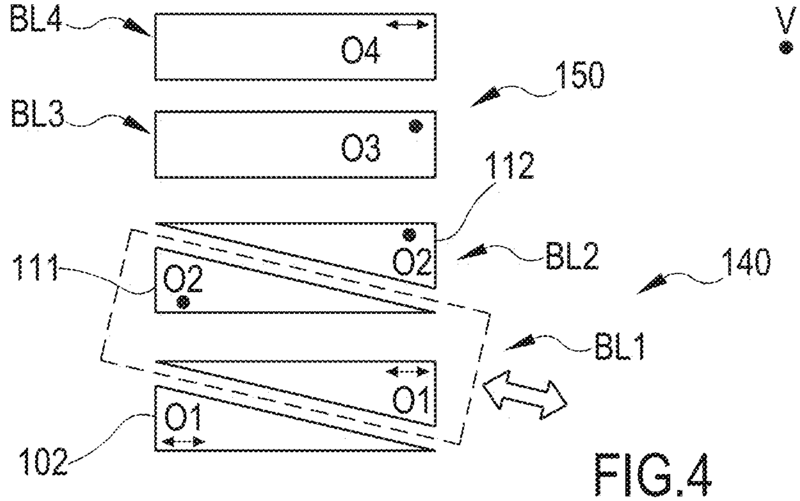
FIG.4

INTERFEROMETER APPARATUS

RELATED APPLICATIONS

This application claims priority under 35 U.S.C. § 119 of IT Patent Application Priority No. 102023000005346 filed on Mar. 21, 2023, and titled Interferometer Apparatus. The content of this application is incorporated herein by reference in its entirety.

BACKGROUND

Technical Field

The present invention relates to an interferometer apparatus.

Description of the Related Art

Interferometers are widely used both in academia and industry for a great variety of applications. They can be used to measure the spectral component of the light, measure the speed of light, evaluate imperfections of transparent materials such as optical elements, measure lengths and more.

Michelson's interferometers and their variations are the most used. In this device, two replicas are created employing a beam splitter, and they travel along different paths. The path travelled by one of the two replicas can be varied and the two are then recombined into one output beam making interference possible. Since the two replicas travel along two distinct paths, they can experience different perturbations and this can negatively affect the quality of the interference. It is a technological challenge to maintain interferometric stability between the two different interferometer arms due to environmental vibrations and perturbations. Indeed, for this approach to work, the path length difference must not fluctuate more than $\lambda/10$, where $\lambda$ is the radiation wavelength. This is the main reason why this technique is de facto restricted to the infrared spectral region and cannot be easily used outside laboratory environments.

To overcome this limitation several common path interferometers were developed in past years. In particular, by using a birefringent material it is possible to divide the two replicas based on their polarization. The optical path difference is given by the different velocities of the replica polarizations travelling through a birefringent material and depends on the thickness of the material.

Differently from a double-beam interferometer, the two replicas travel along the same path and experience the same perturbations, so they are phase locked. This assures great delay stability and interference quality and these devices can work well even with shorter wavelengths down to the visible and ultraviolet range. Moreover, these devices are compact and robust and can be applied also in industrial environments and under harsh conditions.

Documents U.S. Pat. Nos. 3,849,001 and 5,157,458 identify as a possible solution the use of a Babinet-Soleil compensator between two polarizers. The Babinet-Soleil based interferometer has been used in a large variety of applications such as fluorescence spectroscopy (document U.S. Pat. No. 11,181,423), spectral imaging (document U.S. Pat. No. 11,346,719), circular dichroism (document WO2018/115446) and more. This device uses a first birefringent element made of two birefringent wedges to create a variable delay between two replicas having orthogonal polarization. A modified version of a Babinet-Soleil compensator interferometer is described in document US20213/

329228 adding other birefringent elements to compensate for the group velocity dispersion and to lock the propagation delay of one of the two polarizations, useful for pump-probe spectroscopy.

However, the Applicant has noticed that the Babinet-Soleil based interferometers of the above cited documents are very sensitive to the light travelling direction inside the interferometer. The Applicant noticed that this light direction sensitivity is because the birefringence of the used material and the path length inside the crystals is angle-dependent and since such interferometers use two birefringent optical crystals (the second one to permit also negative delays) the dependency is even worsened.

Said dependency severely affects the usage of the interferometer as a spectrometer as the light entering the interferometer needs to be collimated and makes the device suitable only for point-like sources and performs poorly with extended light sources.

In this latter case (i.e. extended light sources), the light cannot be collimated and consists of beams travelling having a multitude of angular directions.

In this case, the interfering output beam shows several spatial fringes alternating high and low intensity for constructive and destructive interference, respectively. The Applicant observes that these fringes are present because the light propagates inside the interferometer with different angular directions and the interferometer delay depends strongly depends on them. So, for certain directions, there is a constructive interference condition and the intensity is high while in others there is destructive interference and the intensity is low.

Moreover, the Applicant has noticed that a single pixel detector spatially integrates the intensity profiles of the output beam and this decreases the interference contrast. To obtain high interferometric contrast the beam size must be reduced by using a small aperture selecting only the portion of the output beam corresponding to a single fringe. The angle dependency of the optical delay is particularly problematic in using the common-path interferometer in imaging such as for spectral imaging or microscopy as described in document U.S. Pat. No. 11,346,719.

In this case, an imaging lens is used which collects the light coming from each point of a large scene of interest. Each ray bundle coming from a specific point comprises a collection of rays propagating with different angles inside the interferometer. This is especially accentuated in imaging closer objects since, for each point of the scene, the range of angles of the collected rays by the lens is bigger.

Another example of a scanning common path interferometer is shown in publication "Birefringent Fourier-transform imaging spectrometer", Vol. 12, Issue 22, pp. 5368-5374 (2004) by A. R Harvey et Al. The interferometer is based on two Wollaston prisms placed in between two polarizers. The first prism separates angularly the replicas and the second one is used to make the two beams collinear again but separated by a distance that depends on the distance between the two Wollaston prisms. A lens is used to recombine spatially the beams and let them interfere with a detector. The second prism is scanned across the beam and due to its configuration, this introduces an optical path difference between the two replicas. The two light replicas interfere at the detector coming from different directions; therefore, also the wavefront of the two beams are inclined accordingly and this causes a loss of the interferometric modulation at the detector that reduces the signal-to-background ratio. Moreover, the Wollaston prisms separate angularly the different spectral components of the light and this further reduces the interferometric modulation at the detector, because the same colour of the two orthogonally polarized replicas impinges on a slightly different position of the camera, thus reducing the interferometric signal.

Moreover, this known interferometer introduces strongly angular dependent delays and this limits the performance of the system for non-point like sources. It is important to note that these two problems increase when the two Wollaston prisms are made bigger in order to increase the maximum interferometric delay and therefore the maximum resolution.

Document US20215/355027 describes an interferometer based on two Wollaston prisms provided in addition with a relay optical system to have the same optical delay for all the points in the object field. However, the Applicant notices that this is true only for light entering the interferometer parallel to the optical axis of the system. Therefore, this approach is severely limited to objects located at infinity or to the use of other optical elements to put the object at infinity. The interferometer of this document has still a strong dependency on the propagating angle inside the system and this severely limits the interferometric contrast hence the light throughput, sensitivity, and field of view of the system.

SUMMARY OF THE INVENTION

The present invention addresses the problem of providing an interferometer apparatus, of the type comprising an adjustable birefringent device producing replicas with orthogonal polarizations, in which the radiation direction dependency is eliminated or reduced so increasing the interference quality and, as an example, obtaining an apparatus that effectively work for single-point radiation sources as well as extended radiation sources.

BRIEF DESCRIPTION OF THE DRAWINGS

Further characteristics and advantages will be more apparent from the following description of a preferred embodiment and of its alternatives given as an example with reference to the enclosed drawings in which:

FIG. 2 exemplary shows a second embodiment of the interferometer apparatus comprising said first compensation optical device and a second adjustable wedge pair;

FIG. 3 schematically shows a third embodiment of the interferometer apparatus comprising said first adjustable wedge pair and a second compensation optical device;

FIG. 4 exemplary shows a fourth embodiment of the interferometer apparatus comprising said second adjustable wedge pair and the second compensation optical device;

DETAILED DESCRIPTION

First Embodiment

Figure 1:
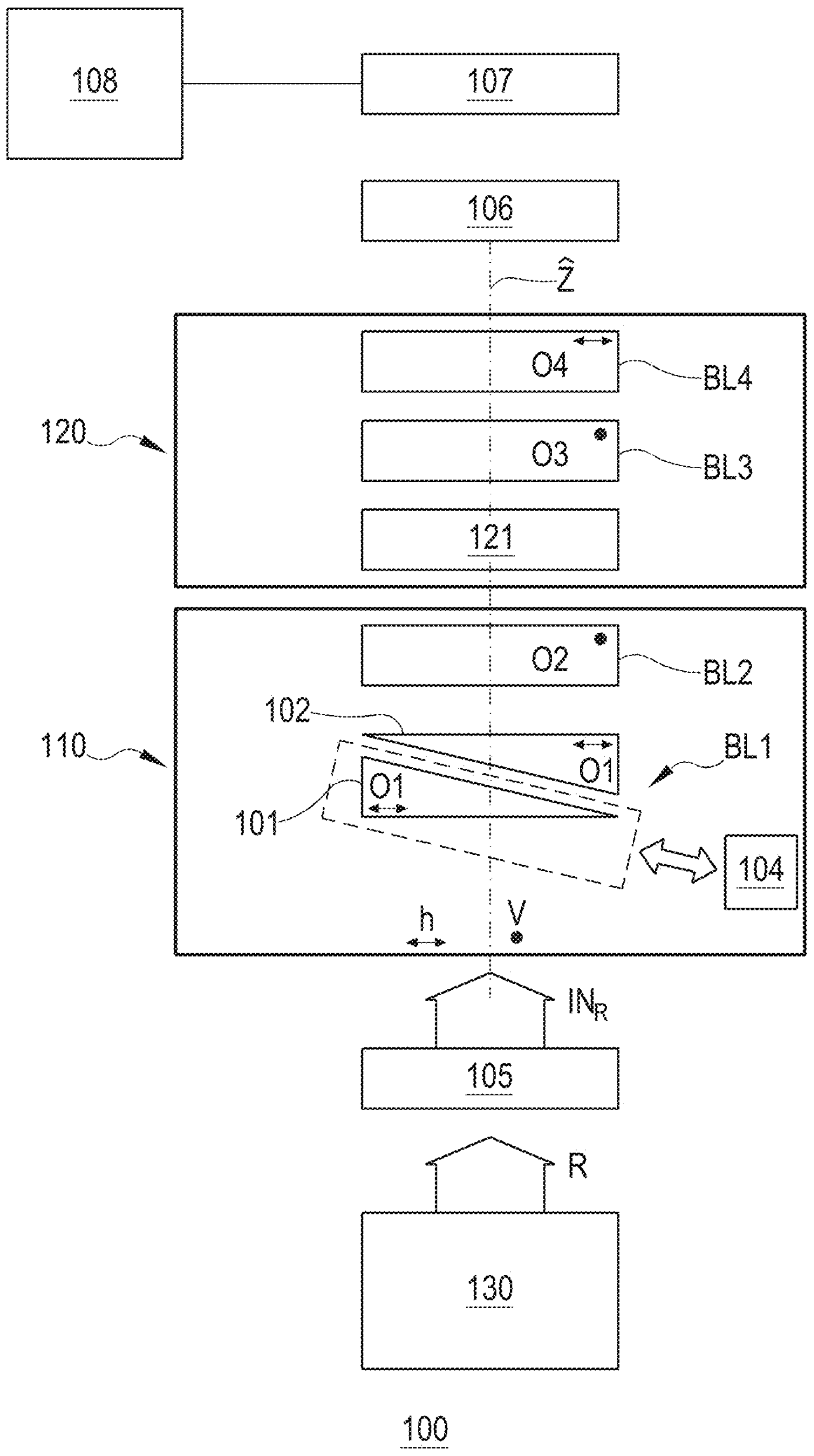
FIG. 1 shows an example of a first embodiment of an interferometer apparatus comprising a first adjustable wedge pair and a first compensation optical device.

FIG. 1 shows a first embodiment of an interferometer apparatus 100 which can be employed for example as a spectrometer, for measuring the photoluminescence of sample, as fluorimeter. As an example, the interferometer apparatus 100 can be applied for spectral images of samples in microscopy and macroscopy.

The interferometer apparatus 100 comprises a first adjustable birefringent device 110 and a first compensation optical device 120, which is optically coupled with the first adjustable birefringent device 110.

Moreover, according to an example, the interferometer apparatus 100 comprises a source module 130 which can be an electromagnetic radiation source or an optical imaging system.

Referring to the case in which the source module 130 is an electromagnetic radiation source, it is configured to generate a radiation (also called "light", without limitation to visible light wavelengths) propagating along the first adjustable birefringent device 110 and the first compensation optical device 120. The electromagnetic radiation source 130 can be a coherent source (e.g. a laser) or an incoherent source (e.g. a lamp). The electromagnetic radiation source 130 can generate polychromatic radiation or monochromatic radiation of either linear or other types of polarizations.

The source module 130 can be even a sample emitting, reflecting or scattering light. In imaging application, an optical imaging system is added in front and/or after the interferometer apparatus 100 and the image of the sample is formed on a bi-dimensional detector.

Particularly, the interferometer apparatus 100 can be configured to operate in one of the wavelength ranges selected from: 180-3500 nm, 500-5000 nm, 400-20000 nm.

In both cases, as schematically represented in FIG. 1, a radiation R, comprising a bundle of rays, emerges from the source module 130. The radiation $IN_R$ defines a main propagation direction $\hat{z}$.

The first adjustable birefringent device 110 is configured to receive an input radiation $IN_R$ and produce corresponding replicas having reciprocally orthogonal polarizations. Such replicas are delayed from each other by an adjustable time delay depending on a configuration assumed by the first adjustable birefringent device 110.

Moreover, as it will be further clarified later, the first adjustable birefringent device 110 introduces an additional time delay between said replicas.

Such additional dependent on an angle of incidence of said radiation on the adjustable birefringent device which is function of a structural thickness and an ordinary and extraordinary refractive indexes of the adjustable birefringent device.

In accordance with the example of FIG. 1, the first adjustable birefringent device 110 is provided with an adjustable wedge pair BL1 and an optical element BL2. The adjustable wedge pair BL1 is configured to provide an adjustable time delay between radiation components passing through it and having reciprocally orthogonal polarizations.

The adjustable wedge pair BL1 comprises a first optical wedge 101 and a second optical wedge 102. Both first 101 and second 102 optical wedges are made of a birefringent material. As an example, the first 101 and second 102 optical wedges have corresponding optical axis o1 of the birefringence material parallel to each other. Particularly, the first optical wedge 101 and the second optical wedge 102 are optical prisms, having, preferably, the same apex angle. The first optical wedge 101 coupled to the second optical wedge 102 is equivalent to an optical plate having variable thickness.

At least one of the two optical wedges 101 and 102 is movable (e.g. it can be translated) along a direction transversal to the main direction 2 by means of an actuator 104, schematically represented in FIG. 1. According to a specific example, the first optical wedge 101 is movable and the second optical wedge 102 is fixed.

The adjustable time delay introduced by the adjustable wedge pair BL1 is dependent on the variable position of the first optical wedge 101. Moreover, as an example, the actuator 104 may be connected to a computer-controlled precision translation stage.

It is noticed that the first 101 and the second optical wedges 102 can be arranged to be very close to each other in order to reduce chromatic dispersion and spatial separation of the replicas. As an example, the first optical wedge 101 and the second optical wedge 102 can be at a distance between the corresponding adjacent tilted faces of 0-1 mm.

In accordance to an example, optical element BL2 is a birefringent plate (e.g. with fixed thickness) having a respective optical axis o2 of the birefringent material perpendicular to the optical axis o1 of adjustable wedge pair BL1 and the main direction 2. The optical element BL2 is coupled with the adjustable wedge pair BL1 and, according to the considered example, is configured to introduce a fixed phase delay between the radiations having reciprocally orthogonal polarizations.

The adjustable wedge pair BL1 (i.e. first optical wedge 101 and second optical wedge 102) is made by a birefringence material having a first ordinary index $n_o$ and a first extraordinary index $n_e$ and has an adjustable thickness t1v. In the following description, one specific value t1 that the variable thickness t1v can assume during the movement of the first optical wedge 101 is considered.

The optical element BL2 is a plate having a thickness t2 equal to the specific thickness t1 of the adjustable wedge pair BL1 and is made by a birefringence material having the same first ordinary index $n_o$ and first extraordinary index $n_e$ defined for the adjustable wedge pair BL1. Preferably, the adjustable wedge pair BL1 and the optical element BL2 are made by the same material such as an example: α-BBO.

Particularly, considering the first ordinary index $n_o$ and the first extraordinary index $n_e$ that characterizes the first adjustable birefringent device 110 it is observed that a first birefringence range Δn can be defined as the difference $n_e$-$n_o$, that can have a positive or a negative sign.

The first compensation optical device 120 is optically coupled to said first adjustable birefringent device 110 and configured to have a respective structural thickness and respective ordinary and extraordinary refractive indexes so as to introduce a compensation time delay between said replicas having a sign opposite to a sign of the additional time delay, so as to reduce the dependence on said angle of incidence in said interferometer apparatus.

According to an example, the first compensation optical device 120 comprises a polarization flipper 121, a first compensation birefringent plate BL3 and a second compensation birefringent plate BL4.

The polarization flipper 121 is an optical device that converts the vertical polarization to a horizontal polarization and vice-versa. As an example, the polarization flipper 121 can be made with a half-wave plate at 45° or with a Fresnel romb. According to the shown example, an input port of the polarization flipper 121 optically coupled with an output of the optical element BL2.

The first compensation birefringent plate BL3 has an input port optically coupled to an output port of the polarizing flipper 121 and second compensation birefringent plate BL4 has an input port optically coupled to an output port of the first compensation birefringent plate BL.

According to an example, the first compensation birefringent plate BL3 is designed to compensate for the angular dependence introduced by optical element BL2 and the second compensation birefringent plate BL4 is designed to compensate for the angular dependence introduced by the In accordance with this example, the first compensation birefringent plate BL3 and the second compensation birefringent plate BL4 are designed so as to satisfy the following conditions:

A) the first compensation birefringent plate BL3 has an optical axis o3 parallel to that o2 of the optical element BL2;

B) the first compensation birefringent plate BL3 has second ordinary index $n_o$' and a second extraordinary index $n_e$' respectively equal to the first indexes $n_o$ and $n_e$ of the optical element BL2; as an example, the first compensation birefringent plate BL3 is made by the same birefringence material of the optical element BL2;

C) the second compensation birefringent plate BL4 has an optical axis o4 parallel to that o1 of the adjustable wedge pair BL1;

D) the second compensation birefringent plate BL4 has the second indexes $n_o'$ and $n_e$ respectively equal to the first indexes $n_o$ and $n_e$ of the adjustable wedge pair BL1;

E) the first compensation birefringent plate BL3 has a thickness t3 equal to that t2 of the optical element BL2;

F) the second compensation birefringent plate BL4 has a thickness t4 equal to the specific value t1 of the adjustable wedge pair BL1.

It is noticed that a condition more general than the conditions E) and F) is that the interferometer apparatus 100 of FIG. 1 is operated such as that the sum of the thickness t1v and t2 assumes a value equal to the sum of the thicknesses t3 and t4, for a specific operative configuration: i.e. when the thickness t1v assumes the specific value t1.

According to specific examples, the interferometer apparatus 100 is further equipped with an input polarizer 105 (particularly, placed between the source module 130 and the first adjustable birefringent device 110) to provide an output radiation of linear polarization transversal to the optical axes o1 and o2 of the first adjustable birefringent device 110 and, preferably, having tilt of 45° with respect to such axes.

With reference to an example, the interferometer apparatus 100 also includes an output polarizer 106 placed, as an example, at the output of the second compensation birefringent plate BL4 and designed to project the two replicas into a common polarization state so as they can interfere.

Moreover, the interferometer apparatus 100 can be equipped with a detector 107 and an analysis device 108. The detector 107 receive the radiation exiting the output polarizer 106 and convert such interfering radiation into an electrical signal that is provided to the analysis device 108 that performs elaborations depending on the particular application.

As the skilled person can recognize, the order of the elements of the interferometer apparatus 00 can be different from the one shown in the drawings. Optionally, some of the above described components may be glued together. Moreover, it is observed that the first adjustable birefringent device 110 and the first compensation optical device 120 may be inserted into an interferometer apparatus different from the one depicted in FIG. 1.

With reference to the operation of the interferometer apparatus 100 of FIG. 1 it is observed that the radiation R produced by the source module 130 passes through the input polarizer 105. Particularly, for input beam polarization, set by the input polarizer 105, as an example at 45° with respect to the optical axes o1 and o2 the adjustable wedge pair BL1 introduces a time delay between the two orthogonally polarized components of the light oriented along the ordinary and the extraordinary axes of the birefringent material. By moving the optical wedge 101 it is possible to continuously change the optical path thus allowing changing the time delay between the two orthogonally polarized components of the radiation, i.e. the two replicas.

The optical element BL2 introduces a fixed time delay between the two orthogonally polarized components of the radiation having a sign opposite to the one introduced by the adjustable wedge pair BL1.

The combination of the adjustable wedge pair BL1 and the optical element BL2 allows setting time delays ranging from positive to negative values.

It is observed that the delay introduced by the first adjustable birefringent device 110 is different for each propagation angle and the delay also depends both on an azimuthal and polar angles of the radiation that enters the first adjustable birefringent device 110, as will further described later.

The polarizations of the two replicas (i.e. the two orthogonally polarized components) exiting the first adjustable birefringent device 110 are exchanged by the polarization flipper 121.

The corresponding components exit the first adjustable birefringent device 110 and pass through the compensation optical device 120. Considering the specific described example, the first compensation birefringent plate BL3 acts on the radiation passing through it by at least partially compensating the time delay amount due to the angular dependence introduced by the optical element BL2. The second compensation birefringent plate BL4 acts on the radiation passing through it by at least partially compensating the time delay amount due to the angular dependence introduced by the adjustable wedge pair BL1. As it will be clarified in the following, the compensation is due to the selection of the birefringence index values and the thickness for the plates BL3 and BL4 with respect that of the first adjustable birefringent device 110.

According to the example described, the compensated radiation, which is under the form of two replicas, exits the first compensation optical device 120 and reaches the output polarizer 106 that projects the two replicas into a common polarization state to cause interference. The interfering replicas are converted into a corresponding electrical signal by the detector 107 and said electrical signal is analyzed by the analysis device 108. It is noticed that the reduction or elimination of the angular dependence from the interfering replicas significantly improves the quality of the obtained interference positively affecting the subsequent analysis of the corresponding electrical signal especially for big detector areas and/or large emitting sources.

The following section provides a description of the operation of the interferometer apparatus 100 with reference to the reduction of the angular dependence and proves, theoretically and by numerical simulations, said compensation effect.

The birefringent materials employable for the components of the interferometer apparatus 100 are, as an example, selectable from the following group: barium borate ($BaB_2O_4$), alpha-barium borate ($\alpha$-$BaB_2O_4$), lithium niobate ($LiNbO_3$), Calomel ($Hg_2Cl_2$), beryl ($Be_3Al_2(SiO_3)_6$), calcite ($CaCO_3$), magnesium fluoride ($MgF_2$), quartz ($SiO_2$), ruby ($Al_2O_3$), rutile ($TiO_2$), sapphire ($Al_2O_3$), silicon carbide (SiC), tourmaline (complex silicate), high zircon ($ZrSiO_4$), low zircon.

It is noticed that the interferometer apparatus 100 of FIG. 1 perfectly compensates the angular dependence only at a very specific time delay, i.e. for a single position (i.e. the specific value t1) assumed by the first optical wedge 101. This compensating effect is reduced while scanning the interferometer to change the effective delay between the two replicas. Indeed, by scanning the first optical wedge 101 of FIG. 1 it is increased the thickness of this component and so its effect on the angular dependency of the interferometer apparatus 100. This can be a problem for very large delays in which there can be an overcompensation or undercompensation.

1. Analysis of the First Embodiment (FIG. 1)

1.1 Behavior of the First Adjustable Birefringence Device 110

1.1.1 Premises: Behavior of a Generic Uniaxial Birefringent Crystal

In a uniaxial birefringent crystal there is a single direction known as the optical axis that represents a centre of symmetry for the material.

Namely, rotating the material around this axis does not change its optical behavior. Each direction with a specific angle with respect to this axis is optically equivalent. No matter its polarization state, the light propagating parallel to the optic axis is governed by a refractive index $n_o$ known as the ordinary refractive index. Considering any other propagation direction, it is always possible to decompose the incoming light polarization into two orthogonal polarizations: one linear polarization that is perpendicular to the optic axis which is called the ordinary ray and experiences a refractive index value $n_o$, and another polarization propagating in the same direction will be oriented partly in the direction of the optic axis. This polarization is called the extraordinary ray and is governed by a different, direction-dependent refractive index.

The propagation of the ordinary ray is simply described by $n_o$ as if there were $n_o$ birefringence involved. The extraordinary ray propagates differently from any wave in an isotropic optical material. This beam has an effective refractive index which has a value in between $n_o$ and $n_e$. Its power flow is not in the same direction as the wave vector which is called also wave normal. Notably, while the power flow does not respect Snell's law and behaves extraordinarily the direction of the wave vector follows it.

Figure 5:
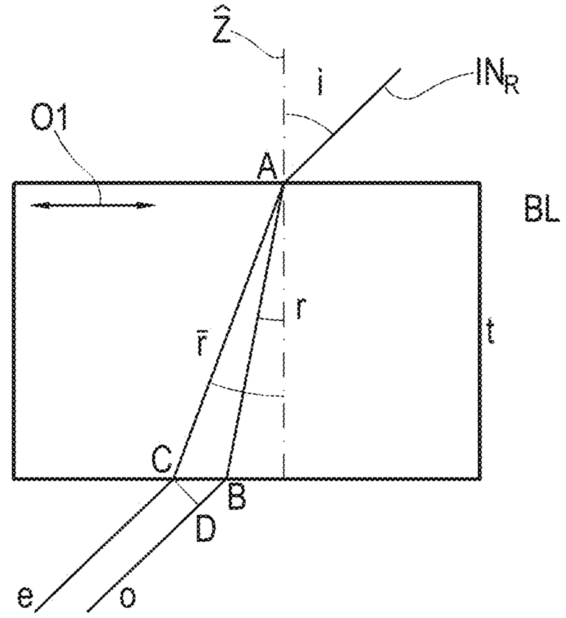
FIG. 5 schematically shows (by a two-dimensionally representation) the propagation for a ray of light incident onto a crystal element.

Particularly, FIG. 5 schematically shows (by a two-dimensionally representation) the propagation for a ray of radiation INr incident onto a crystal element BL (such as a plate having a thickness t) and forming an angle i with the main propagation direction 2, which is perpendicular to the optical axis o1.

Inside the crystal element BL, the light is split into two rays with different angles: a first ray r and a second f. After the crystal element BL the ordinary ray "o" (the first ray r) and extraordinary ray "e" (the second F) travels substantially parallelly with the same angle as the incident ray INr but having a lateral offset CD.

FIG. 2 is a three-dimensional scheme of the used propagation model that allows showing the following:

i is again the incidence angle;

$\hat{o}$ is the versor of the optical axis o1;

$\hat{t}$ is the versor of the transmission direction;

$\theta$ is the angle between the transmission direction $\hat{t}$ and the optical axis direction $\hat{o}$;

$\omega$ is the angle between the optical axis direction $\hat{o}$ and the projection of the transmission versor $\hat{t}$ on the surface SF of the crystal BL.

Figure 6:
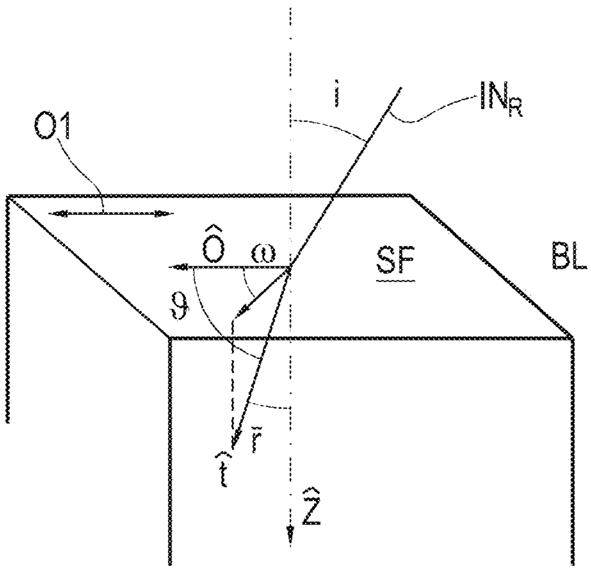
FIG. 6 is a three-dimensional scheme of the transmission into the crystal of FIG. 5.

With reference to FIGS. 5 and 6, the angle $\theta$ is the angle between the optical axis direction $\hat{o}$ and the extraordinary ray wavevector (i.e. the second ray r).

The extraordinary beam "e" experiences an effective refractive index $\bar{n}$ given by:

$$\frac{1}{\bar{n}^2} = \frac{\sin(\theta)^2}{n_e^2} + \frac{\cos(\theta)^2}{n_o^2} \tag{0.1}$$

Or equivalently:

$$\frac{1}{\bar{n}^2} = \frac{1}{n_e^2} - \left(\frac{1}{n_e^2} - \frac{1}{n_o^2}\right)\cos(\theta)^2 \tag{0.2}$$

Considering the light beam INr impinging on the crystal BL with the angle i as in FIGS. 5 and 6, the Snell's law allows finding the angles of refraction r and $\bar{r}$ for the ordinary and extraordinary wave vectors, respectively. The Snell's equations for these vectors are:

$$\sin(i) = n_o \sin(r) \tag{0.3}$$

$$\sin(i) = n_e sin(\bar{r}) \tag{0.4}$$

With the help of these equations, it is possible to evaluate the path difference ΔP between the extraordinary and ordinary waves when they propagate at an angle i into the crystal element BL.

Following FIG. 5 said path difference ΔP can be calculated as $$\Delta P = P_e - P_o = AC - (AB + BD) \text{ where } AC = \frac{t}{\cos(\bar{r})}, AB = \frac{t}{\cos(r)},$$
$$BC = t(\tan(\bar{r}) - \tan(r)), \text{ and } BD = BC\sin(i)$$

Therefore $$\Delta P = \frac{t}{\cos(\bar{r})}\bar{n} - \frac{t}{\cos(r)}n_o - t[\tan(\bar{r}) - \tan(r)]\sin(i)$$

and using equations (1.3) and (1.4) it is obtained:

$$\Delta P = \frac{t}{\cos(\bar{r})}\frac{\sin(i)}{\sin(\bar{r})} - \frac{t}{\cos(r)}\frac{\sin(i)}{\sin(r)} - t[\tan(\bar{r}) - \tan(r)]\sin(i)$$

which is equivalent to:

$$\Delta P = t\sin(i)[\cot(\bar{r}) - \cot(r)]$$

From which the term cot(r) can be evaluated by considering that:

$$\cot(r)^2 = \frac{\cos(r)^2}{\sin(r)^2} = \frac{1 - \sin(r)^2}{\sin(r)^2} = \frac{1}{\sin(r)^2} - 1$$

and using equation (1.3) it is obtained $$\cot(r)^2 = \frac{n_o^2}{\sin(i)^2} - 1,$$

leading to:

$$\cot(r) = \sqrt{\frac{n_o^2 - \sin(i)^2}{\sin(i)^2}} = \frac{n_o}{\sin(i)}\sqrt{1 - \frac{\sin(i)^2}{n_o^2}} \tag{0.6}$$

The term cot(T) can be written as:

$$\cot(\bar{r})^2 = \frac{\cos(\bar{r})^2}{\sin(\bar{r})^2} = \frac{I - \sin(\bar{r})^2}{\sin(\bar{r})^2}. \tag{0.7}$$

Evaluating the term $\sin(\bar{r})^2$ from equation (1.4)

$$\sin(\bar{r})^2 = \frac{1}{\bar{n}^2}\sin(i)^2$$

Where equation (1.2) can be considered to evaluate the term $$\frac{1}{\bar{n}^2},$$

so leading to:

$$\sin(\bar{r})^2 = \left[\frac{1}{n_e^2} - \left(\frac{1}{n_e^2} - \frac{1}{n_o^2}\right)\cos(\theta)^2\right]\sin(i)^2 \tag{0.8}$$

The term $\cos(\theta)^2$ of the last equation cab be evaluated by considering FIG. 6.

So, it is possible to write $\cos(\theta)=\hat{o}\cdot\hat{t}$ where $\hat{t}=\cos(\bar{r})\hat{z}+\sin(\bar{r})\cos(\omega)\hat{o}$, hence $\cos(\theta)=\sin(\bar{r})\cos(\omega)$.

Substituting this value in equation (1.8) and solving for $\sin(\bar{r})^2$:

$$\sin(\bar{r})^2 = \frac{\frac{1}{n_e^2}\sin(i)^2}{\left[1 + \left(\frac{1}{n_e^2} - \frac{1}{n_o^2}\right)\cos(\omega)^2\sin(i)^2\right]} \tag{0.9}$$

Inserting this expression into 1.7, it is obtained:

$$\cot(\bar{r})^2 = \frac{1 + \left(\frac{1}{n_e^2} - \frac{1}{n_o^2}\right)\cos(\omega)^2\sin(i)^2 - \frac{1}{n_e^2}\sin(i)^2}{\frac{1}{n_e^2}\sin(i)^2} \tag{0.10}$$

Finally, the path difference is:

$$\Delta P = t\left[\sqrt{\frac{1 + \left(\frac{1}{n_e^2} - \frac{1}{n_o^2}\right)\cos(\omega)^2\sin(i)^2 - \frac{1}{n_e^2}\sin(i)^2}{\frac{1}{n_e^2}}} - n_o\sqrt{1 - \frac{\sin(i)^2}{n_o^2}}\right] \tag{0.11}$$

It is evident that the above path difference introduces time delay between the replicas that is proportional to the quantity of equation (1.11).

1.1.2 Behavior of the Adjustable Wedge Pair BL1

The above equation (1.11) can be used to design the adjustable wedge pair BL1 since the gap in between the two wedges 101 and 102 can be made by design very small, as an example from 0 to 1 mm; 0-0, 6 mm. Therefore its role in term of the path difference between the extraordinary and ordinary waves is just an offset with $n_o$ contribution to the angular dependency and can be neglected.

Let us consider the optical path difference between the horizontal h and vertical v polarization entering the adjustable wedge pair BL1. With reference to FIG. 1, it is noticed that inside the adjustable wedge pair BL1 the vertical polarization (i.e. perpendicular to the plane of FIG. 1 and therefore perpendicular to the optical axis o1) is the ordinary ray "o" while the horizontal (i.e. parallel to plane of FIG. 1) is the extraordinary "e".

After travelling through adjustable wedge pair BL1 the optical path difference $\Delta P_{h-v}$ is given by equation (1.11) by substituting the thickness t of the crystal element BL with the thickness t of the adjustable wedge pair BL1, as indicated below:

$$\Delta P_{h-v} = t_1\left[\sqrt{\frac{1 + \left(\frac{1}{n_e^2} - \frac{1}{n_o^2}\right)\cos(\omega)^2\sin(i)^2 - \frac{1}{n_e^2}\sin(i)^2}{\frac{1}{n_e^2}}} - n_o\sqrt{1 - \frac{\sin(i)^2}{n_o^2}}\right] \tag{1.12}$$

Figure 7:
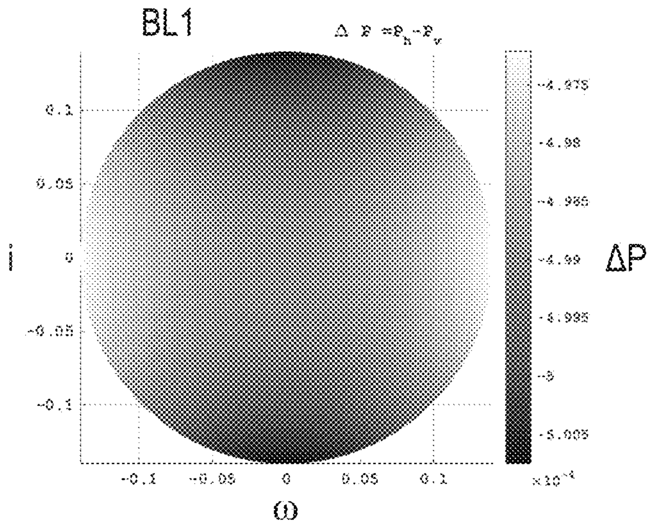
FIG. 7 refers to a numerical simulation result and shows by a polar map an optical path difference as function of incidence angles ω and i for a first wedge pair of said first embodiment.

This optical path difference $\Delta P_{h-v}$ is displayed, for an exemplary case, as a function of $\omega$ and i in FIG. 7 which is a polar map: the distance from the center of the map is the angle of incidence i; $\omega$ is the angle with respect to the x axis of the map. The angles i and $\omega$ are expressed in radiant and the optical path difference $\Delta P_{h-v}$ is expressed in meters.

The map of FIG. 7 refers to a plate of α-BBO crystal (Alpha-Barium Borate) with a thickness $t_1$=0.004 m and an input light with a 400 nm wavelength. The ordinary and extraordinary refractive indexes of this material at 400 nm are: $n_o$=1.6921 and $n_e$=1.5674. The map was calculated in the range $\omega$=[0; 2π] rad and i=[0; 0.14] rad.

1.1.3 Behavior of the Optical Element BL2

With reference to the path difference ΔP introduced by the optical element BL2, this is identical to that of the adjustable wedge pair BL1 but, since the two have an orthogonal optical axis, to model the optical element BL2 it is necessary to use equation (1.11) with the following substitution $\omega=\omega+\pi/2$.

It is noticed that the optical element BL2 has the optical axis o2 rotated by 90 degrees with respect to optical axis o1. In this case, the vertical polarization is the extraordinary ray "e" while the horizontal is the ordinary "o". Therefore, the optical path difference between the horizontal and vertical polarization is:

$$\Delta P_{h-v} = -t_2\left[\sqrt{\frac{1 + \left(\frac{1}{n_e^2} - \frac{1}{n_o^2}\right)\cos(\omega + \pi/2)^2\sin(i)^2 - \frac{1}{n_e^2}\sin(i)^2}{\frac{1}{n_e^2}}} - n_o\sqrt{1 - \frac{\sin(i)^2}{n_o^2}}\right] \tag{0.12}$$

Figure 8:
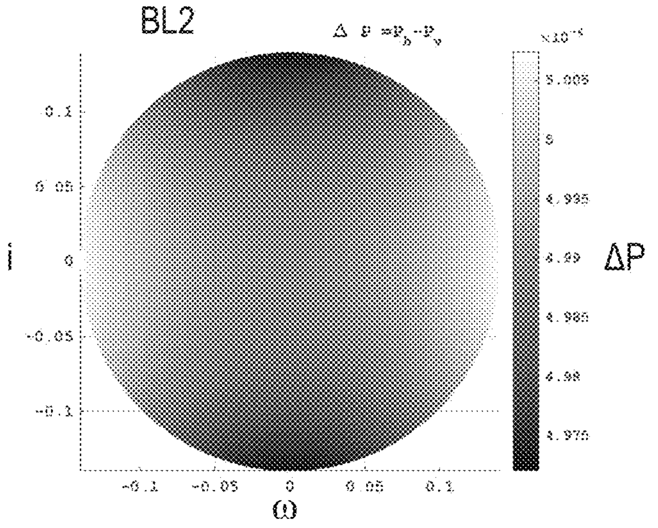
FIG. 8 refers to a numerical simulation and shows by a polar map an optical path difference as function of angles ω and i for an optical element of said first embodiment.

This optical path difference is displayed in FIG. 8 as a function of ω and i, in a manner analogous to the previous figures.

The total amount of the path difference (corresponding to an undesired addition time delay between the two replicas) is given by the sum of the amount of equation (1.12) and the amount of equation (1.13).

Figure 9:
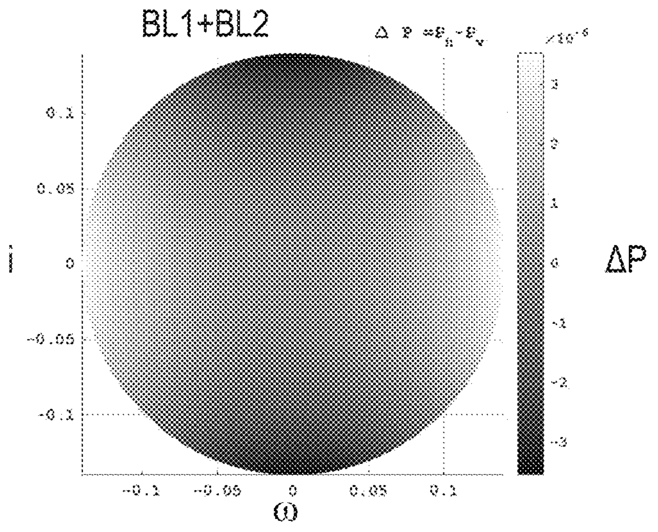
FIG. 9 shows the combined amount of the optical path differences of FIGS. 7 and 8.

While the combined amount of the first adjustable birefringent device 110 is displayed in FIG. 9. These maps are computed using the same parameters of FIG. 7 and $t_1=t_2=0.004$ m.

Figure 10:
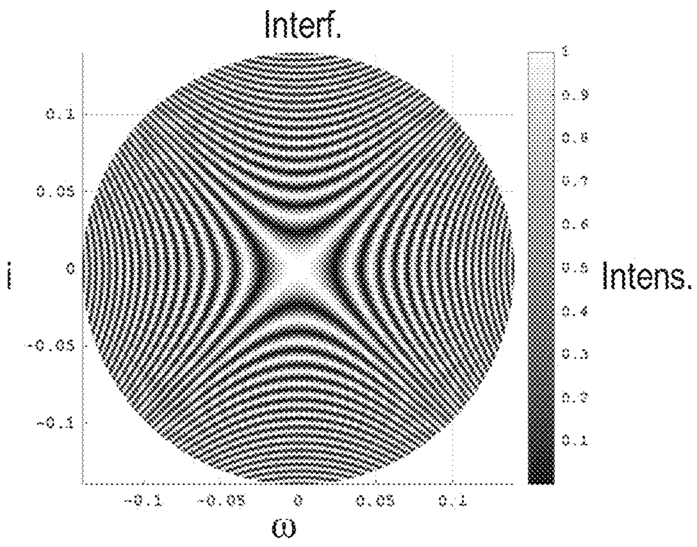
FIG. 10 shows by a polar map the intensity of a radiation exiting the first wedge pair and the optical element of said first embodiment and passing through polarizer.

Considering the interfering radiation exiting a polarizer, the obtained interference at a particular wavelength has the fringe pattern shown in FIG. 10 (Interf.) The map of FIG. 10 shows the intensity (Intens.) of the beam after the progation into the adjustable birefringent device 110. This map is computed for α-BBO crystal and 400 nm radiation. The map is polar: the distance from the center of the map is the angle of incidence i; ω is the angle with respect to the x axis.

It is noticed that the fringe pattern, like that of FIG. 10, is deleterious. As an example, if such type of output beam is focalized into a single point detector this decrease the interference contrast because the signal will be the sum of the intensity values across the beam. The pattern like the one of FIG. 10 decreases the contrast, while using a common path interferometer in imaging mode because the light coming from a single point in the scene traverses the interferometer with many different propagating angles and the resulting interference signal as detected by a pixel of a 2D sensor will reduce the contrast.

This is especially true for shorter wavelengths when these fringes have a higher spatial frequency. Moreover, in imaging mode the interference signal as detected by each pixel has a different phase, hence zero-path difference. Each common fluctuation, as an example due to a perturbed illumination that happens in a particular moment of the scan of the moving element, will have a different phase and the result is that this fluctuation is translated as intensity noise following the same pattern.

1.2 Behavior of the First Compensation Optical Device 120

1.2.1 Behavior of the Polarization Flipper 121

As already indicated, the first compensation optical device 120 has an opposite effect with respect to that of the first adjustable birefringent device 110.

In the embodiment above described, the first compensation optical device 120 is provided with the polarization flipper 121 (to swap the vertical with the horizontal polarization) and the first and second compensation birefringent plates BL3 and BL4, which are two plates with equal thickness with respect to the adjustable wedge pair BL1 and the optical element BL2.

The first and the second compensation birefringent plates BL3 and BL4 have the same thickness in order to not vary the optical path difference between the two replicas, hence polarizations.

After the polarization flipper 121, the vertical polarization becomes horizontal and vice-versa.

The optical path difference considered in the following computing is the path difference between the originally horizontal and vertical polarizations, as indicated before.

1.2.2 Behavior of the First Compensation Birefringent Plate BL3

Inside the first compensation birefringent plate BL3 the originally horizontal polarization is oriented along the vertical axis (i.e. along the optical axis o3 of FIG. 1) and is the extraordinary beam "e". The originally vertical polarization is oriented along the horizontal (i.e. perpendicularly to the optical axis o3 of FIG. 1) and is the ordinary beam "o". For this reason, the optical path difference is:

$$\Delta P_{h-v} = t_3 \left[ \sqrt{\frac{1+\left(\frac{1}{n_e^2}-\frac{1}{n_o^2}\right)\cos(\omega+\pi/2)^2\sin(i)^2-\frac{1}{n_e^2}\sin(i)^2}{\frac{1}{n_e^2}}} - n_o\sqrt{1-\frac{\sin(i)^2}{n_o^2}} \right] \quad (0.13)$$

Figure 11:
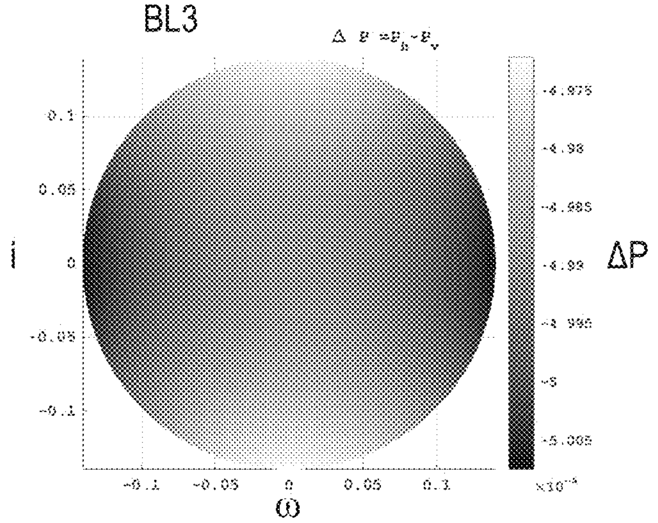
FIG. 11 refers to numerical simulations and shows by a polar map an optical path difference as function of angles ω and i for a first compensation birefringent plate according to said first embodiment.

This optical path difference is displayed as a function of ω and i in FIG. 11. This map was calculated with the same parameters as before but setting $t_3=t_2=t_1=0.004$ m.

1.2.3 Behavior of the Second Compensation Birefringent Plate BL4

Inside the second compensation birefringent plate BL4 the originally horizontal polarization is still oriented along the vertical axis (i.e. perpendicularly to the plane of FIG. 1) and is the ordinary beam "o". The originally vertical polarization is still oriented along the horizontal (parallel to the plane of FIG. 1) and is the extraordinary beam "e", considering the direction of the optical axis o4.

For this reason, the optical path difference introduced by the second compensation birefringent plate BL4 is:

$$\Delta P_{h-v} = -t_4 \left[ \sqrt{\frac{1+\left(\frac{1}{n_e^2}-\frac{1}{n_o^2}\right)\cos(\omega)^2\sin(i)^2-\frac{1}{n_e^2}\sin(i)^2}{\frac{1}{n_e^2}}} - n_o\sqrt{1-\frac{\sin(i)^2}{n_o^2}} \right] \quad (0.14)$$

Figure 12:
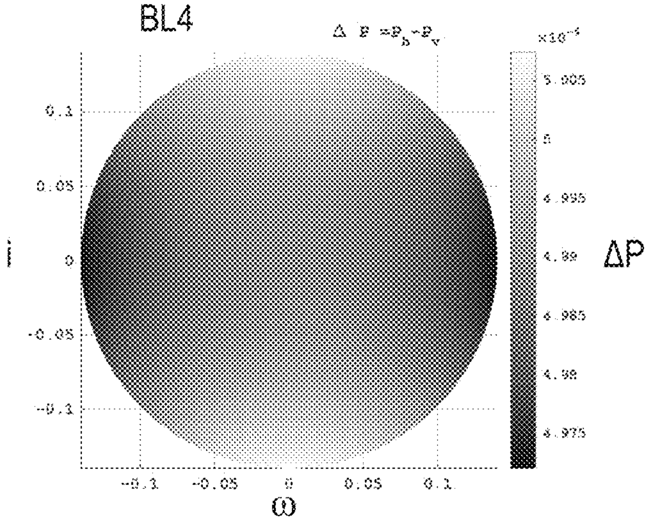
FIG. 12 shows by a polar map an optical path difference as function of angles ω and i for a second compensation birefringent plate according to said first embodiment.

This optical path difference is displayed as a function of ω and i in FIG. 12. This map was calculated with the same parameters as before but setting t4=T3=t2=t1=0.004 m.

Figure 13:
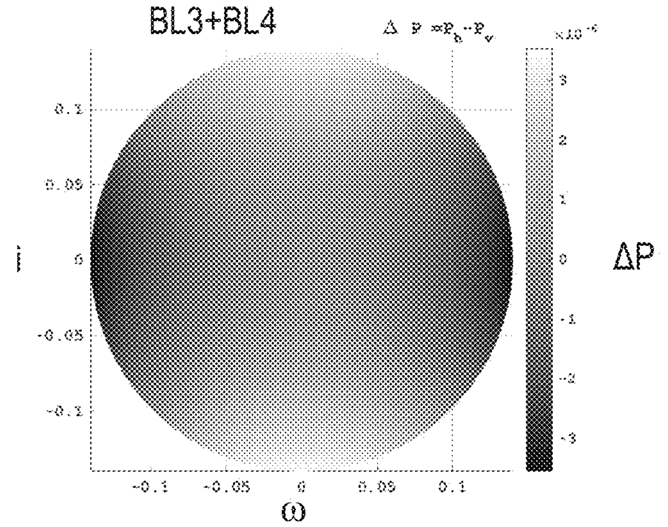
FIG. 13 shows the combined amount of the optical path differences mapped in FIGS. 11 and 12, also considering a polarization flipper included in said first embodiment.

The total path difference introduced by the first compensation birefringent plate BL3 and the compensation birefringent plate BL4, after the polarization flipper 121, is given by the sum of the amount expressed by equations (1.14) and (1.15). An example, of said delay is shown FIG. 13.

The effect is as desired: indeed, the first compensation birefringent plate BL3 and the compensation birefringent plate BL4 causes a path difference with the same magnitude and with an opposite sign as the one generated by first adjustable birefringent device 110, so as to reduce or eliminate the angular dependence.

Figure 14:
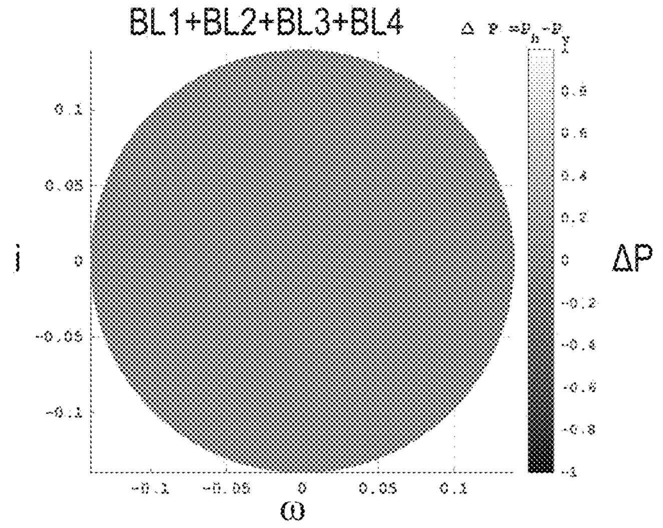
FIG. 14 shows by a polar map the optical path difference introduced by said first adjustable birefringent device and said first compensation optical device.

The total effect of the first adjustable birefringent device 110 and the first compensation optical device 120 is given by the sum of the amount expressed by the equations (1.12), (1.13), (1.14) and (1.15). This total effect is shown, as an example, in FIG. 14 where a uniform field can be appreciated.

Figure 15:
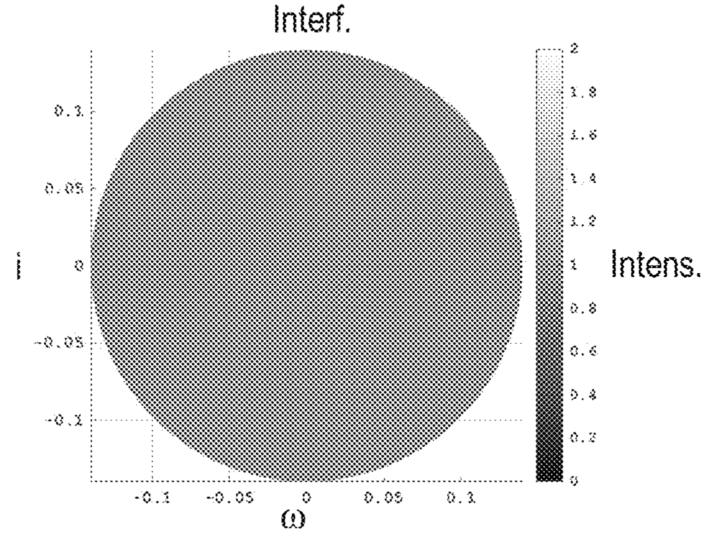
FIG. 15 shows by a polar map the intensity of a radiation exiting the first adjustable birefringent device and the first compensation optical device, made according first embodiment. and passing through polarizer.

The corresponding interference signal across the field is shown in FIG. 15. This map shows the intensity of the beam after the progation into the interferometer apparatus 100. This map is computed for α-BBO crystal and 400 nm radiation. Since the optical path difference is the same for each inciding angle i and ω, so the intensity value is constant.

It is noticed that through the interferometer apparatus 100 of FIG. 1 the two produced replicas propagate “substantially” parallel each other, that is to say that the replicas propagate parallel except when they travel in-between the air-gap of a component comprising an adjustable wedge pair (as the first wedge pair BL1). This consideration is also valid for the other embodiments of the interferometer apparatus 100. It is noticed that said air-gap can be made by design and manufacturing as small as zero.

In this gap the vertical and horizontal polarization replicas travels along different direction angle. This angle is θ=a sin($n_o$ sin α)−a sin($n_e$ sin(α)) where alpha is the apex angle of component 101. This value is very small, considering α-BBO at 400 nm this lead to a value of 1.28°. This small angular deviation lead to an offset between the vertical and horizontal beam given by: Offset=tan(θ) leading to a very small value ranging from 0 to 22 μm for an air gap with a thickness from 0 to 1 mm respectively. This low value is not a problem for many of applications. However, it can be compensated by tilting one of the plate comprised in the interferometer. As an example, by turning counter-clockwise the optical element BL2 in FIG. 1.

2. Second Embodiment (FIG. 2) and Comparison with the First Embodiment (FIG. 1)

FIG. 2 refers to a second embodiment of the interferometer apparatus 100 and shows a second adjustable birefringent device 140 (alternative to the one 110 of figure), optically coupled to the first compensation optical device 120.

The second adjustable birefringent device 140 comprises the adjustable wedge pair BL1 identical or analogous to the one of FIG. 1 (having the first adjustable thickness t1v). In FIG. 2, the positions of the first optical wedge 101 and the second optical wedge 102 have been inverted with respect to FIG. 1.

The optical element BL2 of FIG. 2 is not a single plate but it comprises two optical wedges, where one of the wedges is movable, thus forming another adjustable wedge pair. Particularly, optical element BL2 of FIG. 2 (having an adjustable second thickness t2v) comprises a third optical wedge 111 (movable) and a fourth optical wedge 112 (fixed). In accordance with the example, the third optical wedge 111 is movable synchronously with the first optical wedge 101 of the adjustable wedge pair BL1.

As already noticed the interferometer apparatus 100 of FIG. 1 perfectly compensates the angular dependence only at a very specific time delay, i.e. for a single position (i.e. the specific value t1) assumed by the first optical wedge 101

Instead, the second embodiment described with reference to FIG. 2 allows compensating the angular dependence for each delay of the interferometer apparatus 100, namely, for each variable width of the second adjustable birefringent device 140.

Indeed, while scanning the first wedge 101, increasing its thickness, it is possible to scan also the third optical wedge 111, decreasing its thickness. In this way, the increased angular dependency of adjustable wedge pair BL1 is compensated by the decreasing angular dependency of the optical element BL2.

By looking at FIGS. 7 and 8 (referring to the first embodiment of FIG. 1), it is noticed that, apart from a different offset given by the optical path difference when ω=i=0 (i.e. when the beam is travelling without any tilting angle inside the interferometer), the adjustable wedge pair BL1 and the optical element BL2 introduce approximately the same angular dependency.

Moreover, considering the second embodiment shown in FIG. 2, for the same movement of the movable wedges 101 and 111, it is possible to double the delay with respect to the embodiment of FIG. 1.

This can be very beneficial to increase the spectral resolution of the measurement. It is important to note that the angular dependence as shown in FIGS. 7 and 8 is not perfectly symmetrical. As an example, the angular dependency of the adjustable wedge pair BL1 as shown in FIG. 7 is stronger along the vertical axis with respect to the horizontal axis. The opposite is true for optical element BL2 as shown in FIG. 8. Therefore, the compensation provided by the embodiment of FIG. 1 is not perfect but it is satisfying for many applications. It is noticed that the conditions A-D described with reference to FIG. 1 can be also valid for the second embodiment. Moreover, as an example, it is considered that for the embodiment of FIG. 2 a specific thickness t1 of the adjustable wedge pair BL1, a specific thickness t2 of the optical element BL2, the thickness t3 of the first compensation birefringent plate BL3 and the thickness t4 of the second compensation birefringent plate BL4 are identical and are set as t4=t3=t2=t1=0.004 m.

In this configuration, by scanning the moving wedge of the adjustable wedge pair BL1, the optical element BL2 as shown in FIG. 2, it is possible to vary the thickness of the adjustable wedge pair BL1 from 0 to 8 mm and the thickness of optical element BL2 from 8 to 0 mm, respectively.

As an example, the optical path difference has a maximum change varying the propagating angles from ω=[0; 2π] rad and i=[0; 0.14] rad of less than 110 nm. This calculation is performed by considering a radiation with 400 nm wavelength, hence the change is smaller than half of the considered light wavelength.

It is observed that fact that the change is smaller than half of the considered light wavelength is a feature valid for all the described embodiments.

As an example, considering an interferometer with the same conditions for BL1 and BL2 but without the compensating elements BL3 and BL4, we obtain a maximum change for the optical path differences close to 7 μm. Therefore, the angular dependency of the delay has been decreased by almost two orders of magnitude.

Figure 16:
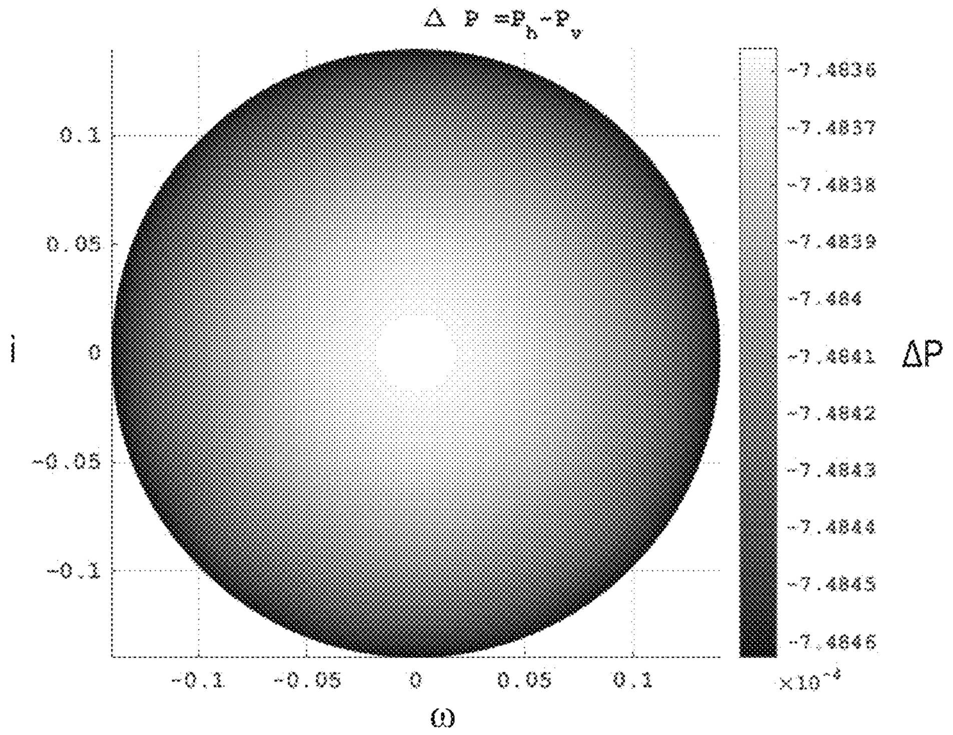
FIG. 16 shows by a polar map the optical path difference obtained with said first compensation optical device and the second adjustable wedge pair as illustrated in FIG. 2.
Figure 17:
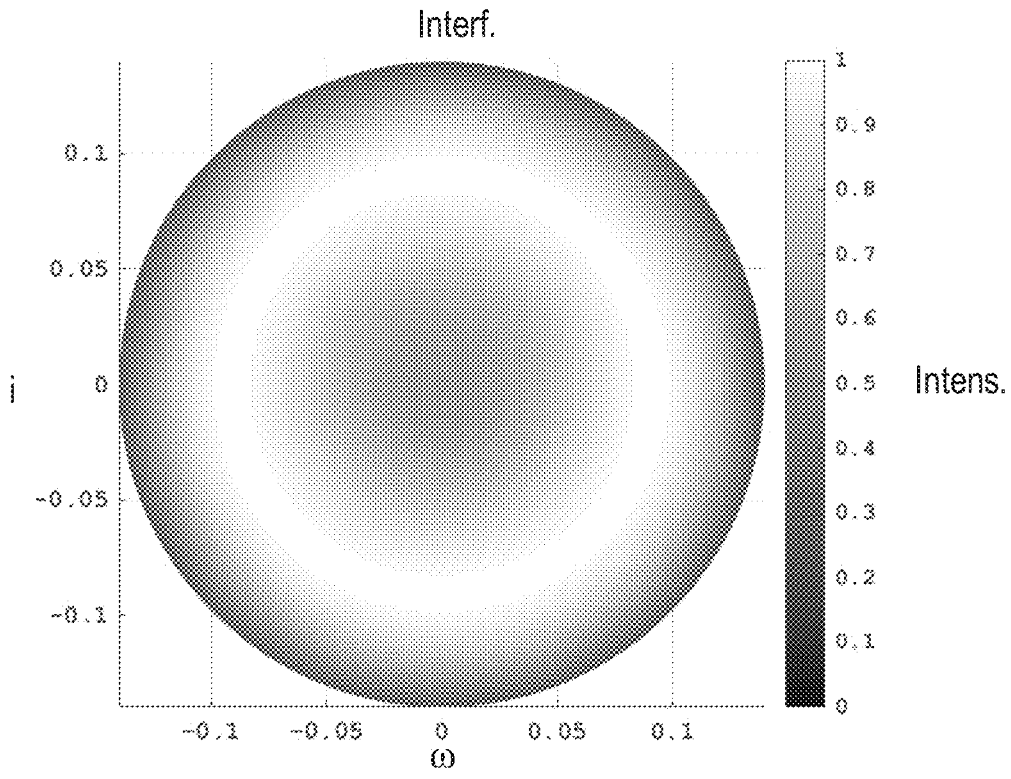
FIG. 17 is a polar map of the intensity of a radiation exiting said first compensation optical device and the second adjustable wedge pair as illustrated in FIG. 2 after having and passed through a polarizer.

The optical path difference for t1=0.007 m, t2=0.001 m and t4=t3=0.004 m is shown in FIG. 16, while the interference pattern is shown in FIG. 17. Particularly, the polar map of FIG. 17 shows the intensity of the beam after the progation completely into the interferometery apparatus 100 including the embodiment of FIG. 2. This map is computed for a α-BBO crystal and 400 nm radiation.

Therefore, the configuration of the second embodiment (FIG. 2) has a very high contrast not only for single-point light sources but also for large sources and in imaging mode as the change, in contrast, is very limited. Moreover, this advantage is retained for every delay of the interferometer.

With reference to FIG. 2, it is noticed that it is possible to operate the interferometer apparatus 100 according to a “thickness-sum condition” more general than conditions F and E above expressed, with reference to FIG. 1 and for the particular embodiment of FIG. 2. According to said thickness-sum condition, the interferometer apparatus 100 is operated so as the sum of the adjustable thicknesses t1v and t2v is maintained equal to the sum of the above defined thicknesses t3 and t4 of the components included into the first compensation optical device 120, for each operative configurations.

This thickness-sum condition refers to the situation in which the adjustable wedge pair BL1, the optical element BL2, the first compensation birefringent plate BL3 and second compensation birefringent plate BL4 are made by the same birefringent material.

3. Third Embodiment (FIGS. 3 and 4)

The third embodiment of the interferometer apparatus 100 is a variant of the first embodiment of FIG. 1 and the second embodiment of FIG. 2, wherein it is employed a second compensation optical device 150, instead of the first compensation optical device 120.

With reference to FIG. 3, the second compensation optical device 150 does not include polarization flippers and is provided with first and second birefringent plates BL3 and BL4 that satisfy the following conditions:

a) the optical axis o3 of the first compensation birefringent plate BL3 is parallel to the optical axis o2 of the optical element BL2;

b) the first compensation birefringent plate BL3 has second indexes $n_o$' and $n_e$' so as to shows a birefringence range having a sign opposite to the sign of the birefringence range of the optical element BL2;

c) the optical axis o4 of the second compensation birefringent plate BL4 is parallel to the optical axis o1 of the adjustable wedge pair BL1;

d) the second compensation birefringent plate BL4 has second indexes $n_o$' and $n_e$' that shows a birefringence range having a sign opposite to the sign of the birefringence range of the adjustable wedge pair BL1.

Particularly, it is further noticed that the material used for the first compensation birefringent plate BL3 and the second compensation birefringent plate BL4 shows a transmission range at least partially overlapping that of the material of the first adjustable birefringent device 110.

According to conditions b) and d), if the birefringence range of the material of the first adjustable birefringent device 110 is negative $\Delta n=n_e-n_o<0$ (such as for α-BBO) the birefringence range of the material employed in second compensation optical device 150 is positive $\Delta n=n_e-n_o>0$.

Indeed, equation (1.11) expressing the difference of path for the first adjustable birefringent device 110, as rewritten below for convenience, is:

$$\Delta P = t\left[\sqrt{\frac{1+\left(\frac{1}{n_e^2}-\frac{1}{n_o^2}\right)\cos(\omega)^2\sin(i)^2-\frac{1}{n_e^2}\sin(i)^2}{\frac{1}{n_e^2}}} - n_o\sqrt{1-\frac{\sin(i)^2}{n_o^2}}\right] \tag{1.11}$$

Applying a Taylor expansion considering that $\sqrt{(1+x)}\approx 1+\frac{1}{2}x$ it is obtained:

$$\Delta P = tn_e\left\{1+\frac{1}{2}\left[\left(\frac{1}{n_e^2}-\frac{1}{n_o^2}\right)\cos(\omega)^2\sin(i)^2-\frac{1}{n_e^2}\sin(i)^2\right]\right\} - tn_o\left(1-\frac{\sin(i)^2}{2n_o^2}\right)$$

The combined effect of the adjustable wedge pair BL1 and the optical element BL2 is, considering t1=t2=t (as already done before):

$$\Delta P = t\frac{1}{2}\frac{n_e^2-n_o^2}{n_e n_o^2}\left[\cos(\omega)^2\sin(i)^2-\sin(\omega)^2\sin(i)^2\right] \tag{0.15}$$

In order to compensate the first and the second compensation birefringent plates BL3 and BL4 should have a thickness $t_2=t_3=t'$ and an ordinary and extraordinary refractive index $n_o$' and $n_e$' such that ΔP=−ΔP'. This is possible only if $n_e$-$n_o$ has an opposite sign with respect to $n_e$'-$n_o$' and the thickness $$t' = -\frac{\frac{n_e^2-n_o^2}{n_e n_o^2}}{\frac{n_e'^2-n_o'^2}{n_e' n_o'^2}}t.$$

Therefore, the value t' of the thickness of the first compensation birefringent plate BL3 (equal to the one of the second compensation birefringent plate BL4) is given by the product of the value t of the thickness of the adjustable wedge pair BL1 (when in a specific position) for a factor which depends on the first indexes $n_o$ and $n_e$ and the second indexes $n_o$' and $n_e$'.

As an example, considering the light wavelength to be 400 nm and the material for adjustable wedge pair BL1 and the optical element BL2 is α-BBO with t1=t2=t=0.004 m. If we consider $TeO_2$ as positive birefringent material having $n_e$'=2.6266 and $n_o$'=2.4412, we obtain a thickness t' is given by: t'=1.5092 t=0.006037 m.

In this further noticed that, analogously to what expressed for FIG. 1, the interferometer apparatus 100 of FIG. 3 can be operated such as that the sum of the thicknesses t1v (component BL1) and t2 (component BL2) is equal to the sum of the thicknesses t3 (component BL3) and t4 (component BL4), for a specific operative configuration: i.e. when the thickness t1v assumes the specific value t1.

4. Fourth Embodiment (FIG. 4)

FIG. 4 refers to a fourth embodiment that is a combination of the second adjustable birefringent device 140 (as the one of FIG. 2) with the second combination device 150 above described with reference to FIG. 3. With reference to FIG. 4, the conditions a)-d) as listed in chapter 3 also apply.

With reference to the embodiment of FIG. 4, the interferometer apparatus 100 can be operated according to the "thickness-sum" condition defined with reference to FIG. 2.

Figure 19:
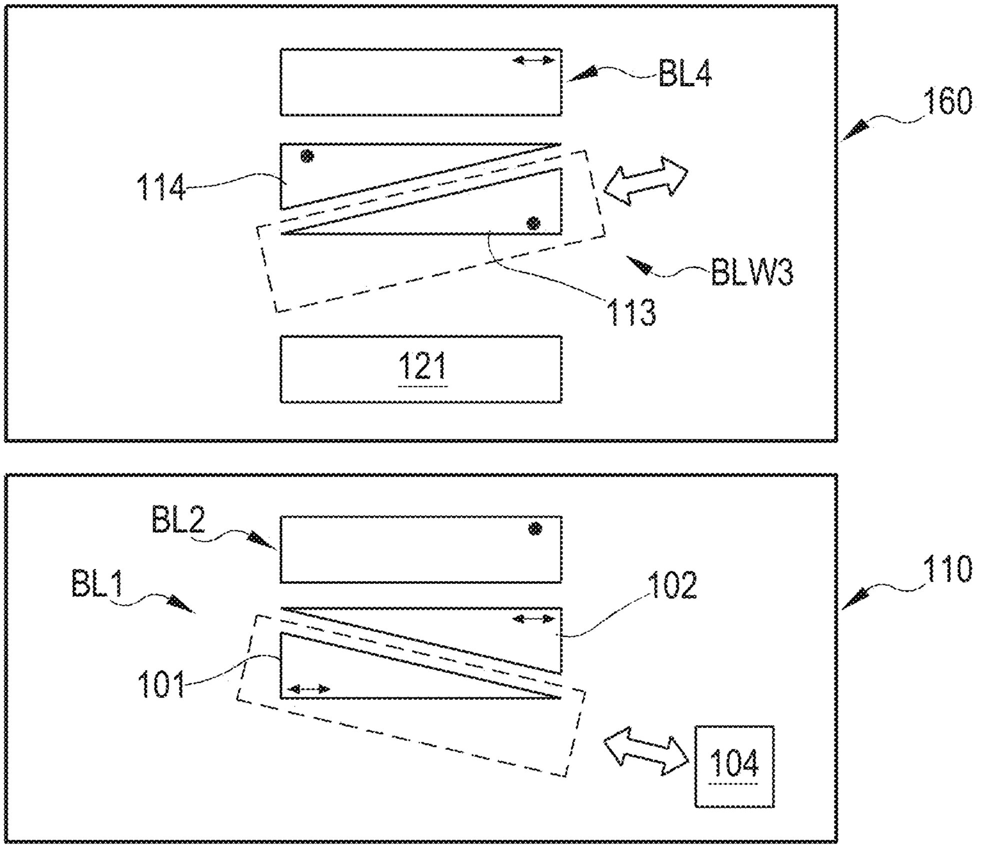
FIG. 19 refers to an embodiment in which a plate like the one of FIG. 1 is employed, replacing the adjustable wedge pair of FIG. 18.
Figure 20:
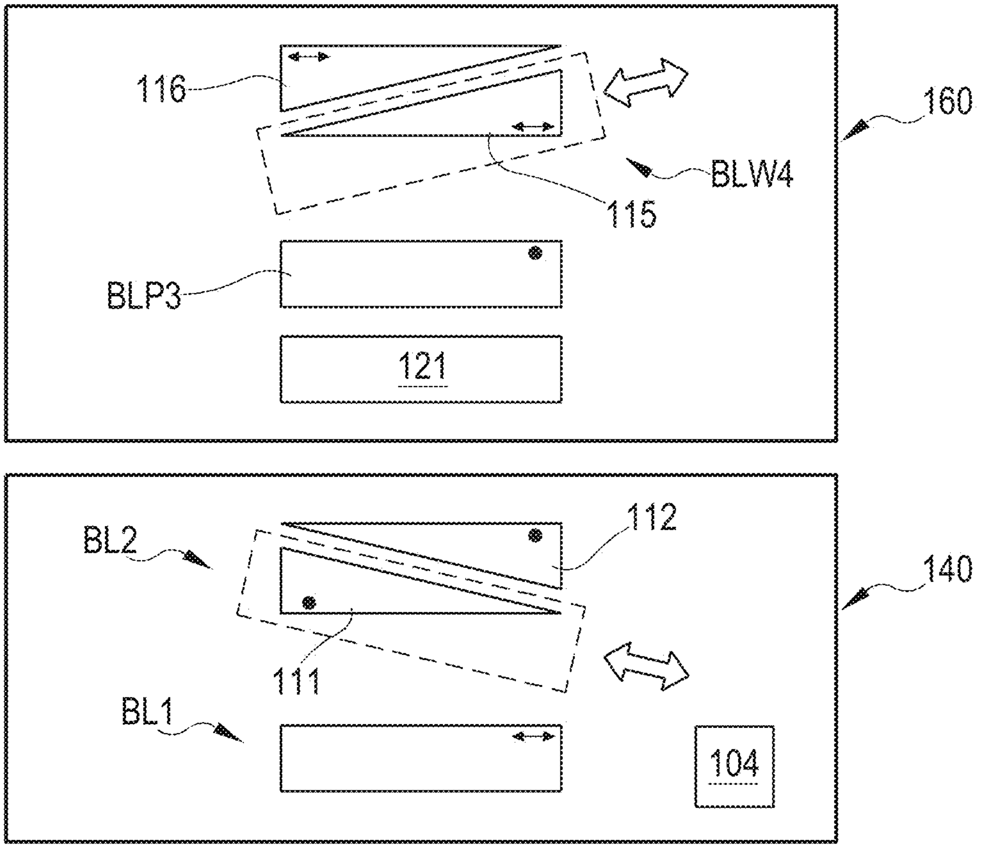
FIG. 20 shows an example of an implementation in which a birefringent foil is employed to replace adjustable wedge pair in FIG. 18.

5. Further Embodiments (FIGS. 18-20)

Figure 18:
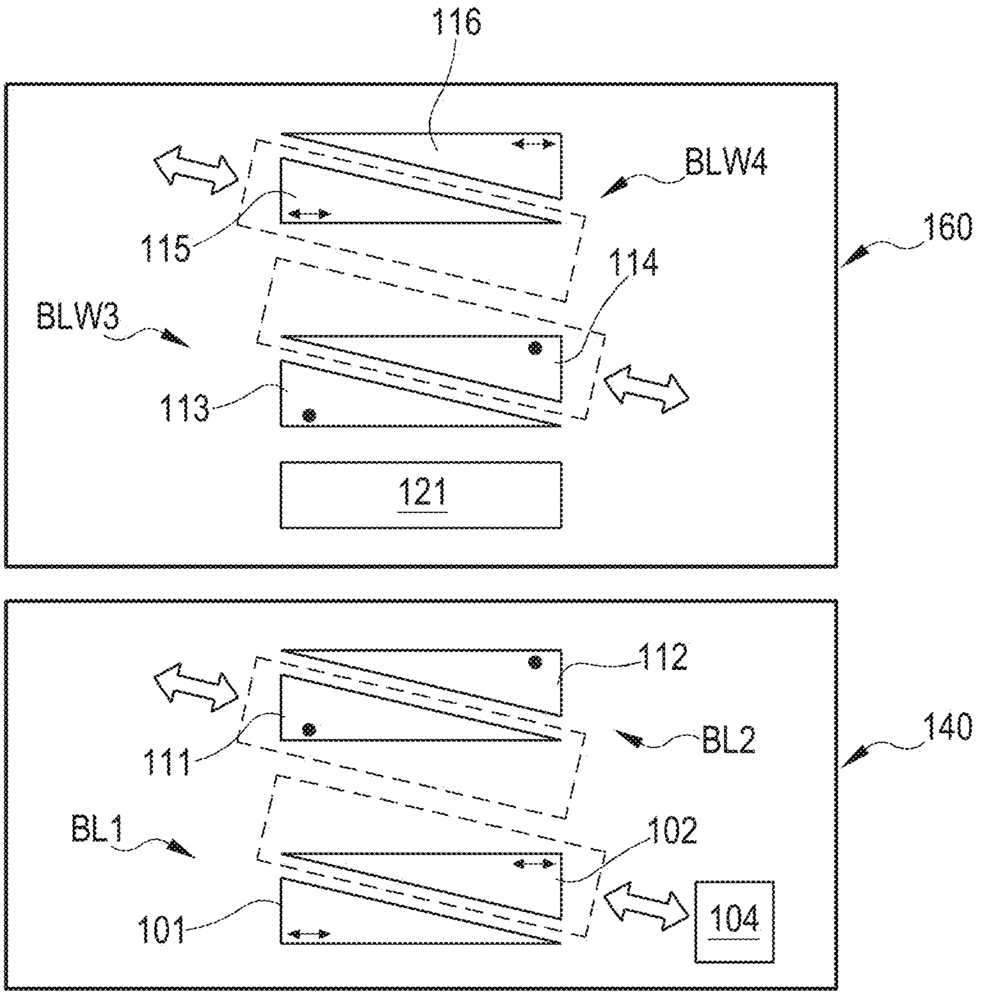
FIG. 18 shows another embodiment in which an adjustable birefringent device identical or similar to the one of FIG. 2 is employed.

FIG. 18 shows another embodiment wherein the second adjustable birefringent device 140, identical or analogous to the one of FIG. 2, is employed and the compensation function is obtained by a third compensation optical device 160 which replaces the first compensation optical device 120 of FIG. 2.

According to the embodiment of FIG. 18, the third compensation optical device 160 includes a first adjustable compensation wedge pair BLW3 (which replaces the first compensation birefringent plate BL3 of FIG. 2), coupled with the polarization flipper 121.

Moreover, according to the embodiment of FIG. 18, the third compensation optical device 160 also includes a second adjustable compensation wedge pair BLW4 (which replaces the second compensation birefringent plate BL4 of FIG. 2), coupled with the first adjustable compensation wedge pair BLW3.

The first adjustable compensation wedge pair BLW3 (which can be analogous to one of the previous described wedge pairs) includes a fifth optical wedge 113 and a sixth optical wedge 114. The first adjustable compensation wedge pair BLW3 defines the thickness t3.

The second adjustable compensation wedge pair BLW4 includes a seventh optical wedge 115 and an eight optical wedge 116. The second adjustable compensation wedge pair BLW4 defines the thickness t4.

As described for the embodiments of FIGS. 2 and 4, the interferometer apparatus 100 including the components shown FIG. 18 is operated so as to meet the above defined thickness-sum condition (considering that the components BL1, BL2 and BLW3 and BLW4 have adjustable thicknesses).

It is noticed that, advantageously, all the movable optical elements of FIG. 18 can be actuated by the same motor 104 provided with suitable motions transmission devices.

The embodiment of FIG. 18 is particularly advantageous since ensures a high delay range leading to a better spectral resolution with a full compensation of the angle dependency of the time delay between the replicas.

Considering the embodiment of FIG. 18 it is noticed that is also possible to design other implementations.

According to a first implementation shown in FIG. 19, the adjustable wedge pair BL2 of FIG. 18 is replaced with a plate as the one of FIG. 1, so employing the first adjustable birefringent device 110 of FIG. 1 which replaces the second adjustable birefringent device 140.

Moreover, in the third compensation optical device 160 of FIG. 19, the second adjustable compensation wedge pair BLW4 is replaced by the second compensation birefringent plate BL4, as the one shown in FIG. 1.

FIG. 20 shows a second example of implementation, wherein the second adjustable birefringent device 140 includes a first birefringent plate BLP1, that replaces the adjustable wedge pair BL1 of FIG. 18. With reference to the third compensation optical device 160, it includes a second birefringent plate BLP3 that replaces the first adjustable compensation wedge pair BLW3 of FIG. 18. According to the example of FIG. 20, the first birefringent plate BLP1 is analogous to the second compensation birefringent plate BL4 and the second birefringent plate BLP3 is analogous to the first compensation birefringent plate BL3.

The interferometer apparatuses 100 including the components of FIG. 19 or 20 can be operated so as to meet the above defined thickness-sum condition.

It is noticed that the described embodiments of the interferometer apparatus 100 allows producing delayed replicas having orthogonal polarizations wherein the delay is not strongly influenced by the propagating angle and by the entering position of the input radiation with respect to the propagation axis travelling in the center of each optical element of the interferometer. Moreover, the two obtained replicas are substantially (according to the meaning already described) parallel having $n_o$ separating angle.

SYMBOLS EMPLOYED IN THE DRAWINGS interferometer apparatus 100
first optical wedge 101
second optical wedge 102
actuator 104
input polarizer 105
output polarizer 106
detector 107
analysis device 108
first adjustable birefringent device 110
third optical wedge 111
fourth optical wedge 112
first compensation optical device 120
polarization flipper 121
source module 130
second adjustable birefringent device 140
second compensation optical device 150
radiation R
main propagation direction 2
input radiation $IN_R$
adjustable wedge pair BL1
optical element BL2
first compensation birefringent plate BL3
second compensation birefringent plate BL4
third compensation optical device 160
first adjustable compensation wedge pair BLW3
second adjustable compensation wedge pair BLW4
fifth optical wedge 113 a
sixth optical wedge 114
seventh optical wedge 115
eight optical wedge 116
first birefringent plate BLP1
second birefringent plate BLP3

The invention claimed is:

1. An interferometer apparatus comprising:

an adjustable birefringent device configured to:

receive an input radiation ($IN_R$) and produce corresponding replicas (e, o) having reciprocally orthogonal polarizations and delayed from each other by an adjustable time delay depending on a configuration assumed by the adjustable birefringent device;

introduce an additional time delay between said replicas (e, o) dependent on angles of incidence (i, ω) of said input radiation on the adjustable birefringent device, wherein the angles of incidence (i, ω) is a function of a structural thickness and an ordinary and an extraordinary refractive index of the adjustable birefringent device;

a compensation optical device that is optically coupled to said adjustable birefringent device and configured to have a respective structural thickness and respective ordinary and extraordinary refractive indexes so as to introduce at least a partial compensation time delay between said replicas having a sign opposite to a sign of the additional time delay so as to reduce the dependence on the angles of incidences (i, ω) in the interferometer apparatus;

wherein the adjustable birefringent device comprises:

a first birefringent component having a first thickness and a first optical axis; and a second birefringent component having a second thickness and a second optical axis perpendicular to the first optical axis;

wherein the compensation optical device comprises:

a third birefringent component having a third thickness and a third optical axis parallel to the second optical axis; and a fourth birefringent component having a fourth thickness and a fourth optical axis parallel to the first optical axis; and wherein:

the first birefringent component, the second birefringent component, the third birefringent component and the fourth birefringent component are made by uniaxial birefringent crystal materials;

each of said optical axes being configured so that a radiation propagating along the respective optical axis is governed by the corresponding ordinary refractive index; and at least one of the first, second, third and fourth birefringent components comprise a respective adjustable wedge pair comprising:

a respective optical wedge, a respective moveable optical wedge, each of which are made by uniaxial birefringent crystal materials, and having parallel respective optical axes and equal respective apex angles.

2. The apparatus according to claim 1, wherein the input radiation ($IN_R$) defines a main propagation direction (z) and includes rays forming an angle with said main propagation direction in the range of between 0 rad-0.14 rad.

3. The apparatus according to claim 1, wherein:

wherein a sum of the first thickness of the first birefringent component and the second thickness of the second birefringent component is equal to a sum of the third thickness of the third birefringent component and the fourth thickness of the fourth birefringent component.

4. The apparatus according to claim 1, wherein:

the first birefringent component comprises an adjustable wedge pair comprising an optical wedge and a movable optical wedge, configured to provide a first adjustable time delay between said replicas, wherein the first adjustable time delay is dependent on a variable position of the movable optical wedge;

the second birefringent component comprises an optical plate coupled with the adjustable wedge pair and configured to introduce a fixed second delay between said replicas.

5. The apparatus according to claim 1, wherein:

the third birefringent component is selected from the group comprising an optical birefringent plate, and an adjustable wedge pair; and the third birefringent component is configured to introduce a first compensation delay;

the fourth birefringent component is selected from the group comprising an optical birefringent plate, and an adjustable wedge pair;

the fourth birefringent component is configured to introduce a second compensation delay.

6. The apparatus according to claim 1, wherein the compensation optical device further comprises:

a polarization flipper optically coupled with the adjustable birefringent device and configured to convert between horizonal polarization of the replicas and vertical polarization.

7. The apparatus according to claim 6, wherein:

the third birefringent component has an optical axis (o3) parallel to an optical axis (o2) of the second birefringent component;

the third birefringent component and the second birefringent component have equal ordinary indexes and equal extraordinary indexes;

the fourth birefringent component has an optical axis (o4) parallel to an optical axis (o1) of the first birefringent component; and the fourth birefringent component and the first birefringent component have equal respective ordinary indexes and equal respective extraordinary indexes.

8. The apparatus according to claim 1, wherein:

the third birefringent component has an optical axis (o3) parallel to an optical axis (o2) of the second birefringent component;

the second birefringent component has ordinary and extraordinary indexes, $n_o$ and $n_e$, to define a first birefringence range $n_e$-$n_o$ having a first sign;

the third birefringent component has second ordinary and extraordinary indexes, $n_o'$ and $n_e'$, to define a second birefringence range $n_e'$-$n_o'$ having a second sign opposite to said first sign;

an optical axis (o4) of the fourth birefringent component is parallel to an optical axis (o1) of first birefringent component;

the fourth birefringent component shows said second birefringence range having the second sign and the first birefringent component shows said first birefringence range having the first sign.

9. The apparatus according to claim 1, wherein each of said first birefringent component, second birefringent component, third birefringent component and fourth birefringent component includes a respective adjustable wedge pair.

10. The apparatus according to claim 9, further including a motor connected to each of said first birefringent component, second birefringent component, third birefringent component and fourth birefringent component.

11. The apparatus according to claim 1, further comprising:

an input polarizer configured to receive a first radiation (R) and produce said input radiation ($IN_R$) under the form of a linear polarization transversal to optical axes of said adjustable birefringent device.

12. The apparatus according to claim 11, further comprising:

an output polarizer configured to project the replicas to a common polarization state;

a detector configured to convert interfering radiation that exits the output polarizer to an electrical signal;

an analysis device configured to receive the electrical signal and perform elaborations.

13. The apparatus according to claim 1, configured to operate as one of the following devices: spectrometer, device for measuring the photoluminescence of samples, fluorimeter device; spectral imager.

14. The apparatus according to claim 1, wherein the corresponding replicas are produced to propagate substantially parallel to each other.

* * * * *